Patented Mar. 7, 1944

2,343,547

UNITED STATES PATENT OFFICE 2,343,547

ORGANO-MERCURY COMPOUND

Samuel M. Gordon, Forest Hills, and Frank Kipnis, Brooklyn, N. Y., assignors to Endo Products, Inc., Richmond Hill, N. Y., a corporation of New York No Drawing. Application May 9, 1941, Serial No. 392,666

1 Claim. (Cl. 260—434)

Our invention relates to new and improved organo-mercury compound.

One of the objects of our invention is to provide improved organo-mercury compounds in which the mercury is combined in a non-ionic manner so that a precipitate of mercury sulphide is not formed, when the improved organo-mercury compound is treated with hydrogen sulphide.

Another object of our invention is to provide improved organo-mercury compounds which can be used for therapeutic purposes. For example, the improved compounds can be used as diuretic agents, in relieving the edema and other characteristic symptoms which are associated with lack of diuresis, and which are concomitant with certain abnormal renal and cardiac conditions. However, the improved compounds can be used for various other purposes.

More particularly, our invention relates to the preparation of mercury derivatives of ortho-allyl-phenoxy-acetic acid.

Other objects of our invention will be stated in the annexed description which illustrates several preferred embodiments thereof.

In order to fully explain the subject matter of our invention, we will set forth one method of manufacturing ortho-allyl-phenoxy-acetic acid.

EXAMPLE 1

*Manufacture of ortho-allyl-phenoxy-acetic acid*

Ten parts of monochloracetic acid, ten parts of sodium hydroxide and fourteen parts of ortho-allyl phenol are dissolved in water and the solution is boiled for four hours with the use of a reflux condenser, at a temperature of about 120° C. The solution is then acidulated with hydrochloric acid until acidity is indicated by a suitable indicator, such as Congo red. The precipitate which thus results is extracted with appropriate parts of isopropyl ether, in which the precipitate is soluble. The extraction with the isopropyl ether is carried out at a temperature of about 20° C. The reaction product is then extracted from this solution in the isopropyl ether, by intermixing said solution several times with respective batches of suitable volume of an aqueous solution of sodium carbonate, which contains 10% by weight of dissolved sodium carbonate. The extraction with the use of the aqueous solution of sodium carbonate is carried out at a temperature of about 20° C. The solution of the reaction product in the aqueous solution of sodium carbonate is then acidulated with dilute sulfuric acid until the reaction product is separated from said solution, as a precipitate. The reaction product is then filtered and it is recrystallized from carbon tetrachloride. This reaction product, namely, ortho-allyl-phenoxy-acetic acid, melts at 145° C. Its color is white.

Whenever proportions are stated in this example or elsewhere in this specification, said proportions are by weight.

EXAMPLE 2

The ortho-allyl-phenoxy-acetic acid is dissolved in sufficient absolute methanol, at a temperature of about 63° C., in order to bring about complete solution. This solution is then treated at a temperature of about 63° C. with a solution in absolute methanol, of a molecular equivalent of pure mercuric acetate, under vigorous agitation, 19.2 parts of ortho-allyl-phenoxy-acetic acid being thus reacted with 31.8 parts of mercuric acetate. A white precipitate is formed by means of the reaction. This white precipitate is allowed to remain in the mother liquid and to cool to a room temperature of about 22° C., during a period of three hours. The white precipitate is then separated from the mother liquid by filtration. The precipitate is then washed with ethyl ether, and the washed precipitate is then thoroughly dried.

The resultant product is ortho-(mercuri-acetoxy-methoxy-propyl)-phenoxy-acetic acid. Its color is white, and it melts at 212° C. It is soluble in aqueous solutions of sodium hydroxide and potassium hydroxide. It is also soluble in ammonium hydroxide and in various organic amines, such as monoethanolamine, diethanolamine and the like. In order to utilize the improved compound therapeutically, 10 parts thereof are dissolved in a molar amount of sodium hydroxide, potassium hydroxide, ammonium hydroxide, monoethanolamine or methylglucamine, dissolved in water, and made up to an appropriate volume, such as 100 cc. We can use aqueous solutions of other organic amines and alkanol amines and polyhydroxyamines.

Although the above mentioned organo-mercury compound is valuable for many purposes, it can also be used as an intermediate for producing a superior organo-mercury compound.

EXAMPLE 3

Six parts of the compound which is produced by the method which is disclosed in Example 2, are dissolved in a solution of one part of sodium hydroxide in ten parts of water. This is done at room temperature of about 21° C. and the solution is allowed to stand at said room temperature for about twenty-four hours. A yellow color is developed, which is removed by stirring the solution with activated charcoal and separating the activated charcoal by filtration. The filtrate is then stirred and carbon dioxide is bubbled through the filtrate, until precipitation has been completed. This reaction is carried out at ordinary room temperature of 21° C. The precipitate is then separated by filtration and it is then dried. It may be washed with ethyl ether prior to drying the same. The dry precipitate is ortho-(mercuri-hydroxy-methoxy-propyl)-phenoxy-acetic acid. Its color is white and it melts at 210° C.

The reaction product which results from the method which is specified in Example 3 can be dissolved in aqueous solutions of sodium hydroxide, potassium hydroxide, and the other substances above mentioned. In order to use the aforesaid product for therapeutic purposes, ten parts thereof are dissolved, for example, in an aqueous solution of sodium hydroxide, which contains a molar quantity of sodium hydroxide and this is diluted to an appropriate volume. The reaction product reacts with the bases above mentioned, such as the sodium hydroxide and the potassium hydroxide, the organic amines and alkanol amines and polyhydroxy alkylamines, to produce the corresponding soluble salts of the respective organo-mercury compound.

We can use other alcohols instead of methanol, thus producing other alkoxy derivatives, instead of the methoxy derivative. Likewise, we can use other mercury salts of organic acids, thus producing other acyloxy groups, instead of the acetoxy group.

Some of the other alcohols which we can use are as follows: ethanol, isopropanol, propanol and the butanols.

We can also use the mercury salts of other organic acids, in addition to mercuric acetate, such as mercuric propionate, mercuric butyrate, mercuric tartrate, etc.

Generally speaking, our invention covers organic mercury compounds of the general formula

where R is an alkyl group containing from one to four carbon atoms, and R' is an acyl radical containing from two to four carbon atoms, or it is an hydroxyl group.

The above general formula includes the reaction products of Examples 2 and 3.

In the examples we have referred to a reaction product which is derived from ortho-allyl-phenol. The invention includes the use of para and meta derivatives of allyl-phenol.

We cannot use the mercury salt of formic acid, because formic acid is a vigorous reducing agent. As previously stated, the methanol can be replaced by other aliphatic alcohols, but we prefer not to use hexanol because this has a tendency to reduce mercury actate to mercury, under the action of heat.

We can use the isomers of the higher aliphatic alcohols which are specified herein, up to butanol, but we prefer not to use the tertiary alcohols, although we include the use of the secondary alcohols.

We can use the isomers of the selected organic acids which have been specified, namely, the straight and branch chain aliphatic acids.

Upon reaction with mercuric acetate and the alkanol, the allyl group becomes saturated to the propyl group. The ethanolamine and the methylglucamine are generally designated as alkanol amines or hydroxylated amines.

We have described preferred embodiments of our invention, but numerous changes and omissions can be made therefrom, without departing from the spirit of the invention.

The structural formula of the ortho (mercuri-hydroxy-methoxy-propyl) phenoxy acetic acid is

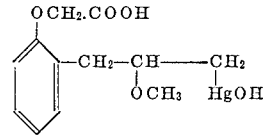

In the water-soluble form, the terminal H of the $OCH_2.COOH$ group has been replaced by Na, K, and other atom or group which forms a salt-like compound.

We claim:

As a new compound, ortho(mercurihydroxy-methoxy-propyl) phenoxy acetic acid, having the formula,

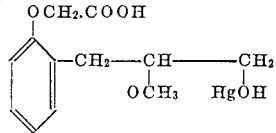

SAMUEL M. GORDON.
FRANK KIPNIS.